March 7, 1939. J. FLAMM 2,149,516

INTERNAL COMBUSTION ENGINE

Filed Oct. 19, 1936

Inventor
J. Flamm
by
Attorney

Patented Mar. 7, 1939

2,149,516

UNITED STATES PATENT OFFICE 2,149,516

INTERNAL COMBUSTION ENGINE

Joseph Flamm, West Allis, Wis., assignor to Allis-Chalmers Manufacturing Company, Milwaukee, Wis., a corporation of Delaware Application October 19, 1936, Serial No. 106,266

4 Claims. (Cl. 123—198)

This invention relates to internal combustion engines and more particularly to oil engines employing a high tension ignition system designed to produce an extremely hot or fat spark to facilitate ignition of the combustible mixture.

Ignition systems having the aforementioned qualities have attained a prominent place in the oil engine field particularly in connection with the development of the low compression solid injection oil engine utilizing relatively heavy non-volatile fuels and having timed injection and ignition of the fuel charges since a hot or fat spark produces more heat at the spark gap and fans out and contacts a larger portion of the mixture thereby vaporizing more of the injected fuel which facilitates its ignition and materially reduces the time interval between the production of the spark and the initiation of combustion. In addition, such an arrangement permits the use of a wider spark gap thus making the actual spacing of the electrodes or the setting of the gap less critical.

Although the use of a hot spark system does materially improve engine operation, the application of such a system to vehicle engines and more particularly tractor engines of the heavy oil type has been materially retarded due to the fact that the breaker points and their operating mechanisms, which are necessarily totally enclosed to keep out dust and other foreign matter, are subjected to a destructive corrosive action that soon causes deterioration and breakage. The corrosive action is believed to be due either to the formation of ozone, which is an extremely powerful oxidizing agent and may be produced by a high frequency silent discharge accompanying the extremely rapid breaking of the circuit at the breaker points or to the formation of some compound having a similar oxidizing effect which may be produced by the spark or arc that may accompanyiny each interruption of the circuit.

Consequently, the primary object of this invention is to provide an arrangement of parts which will completely eliminate the aforementioned defects.

Another object of this invention is to provide an arrangement of parts for overcoming the previously mentioned defects which is simple, durable, cheap to manufacture and can be readily applied to existing engines.

The invention accordingly consists of the features of construction, combinations of elements and arrangement of parts as more particularly pointed out in the appended claims and in the detailed description, reference being had to the accompanying drawing, in which:

Figure 1:
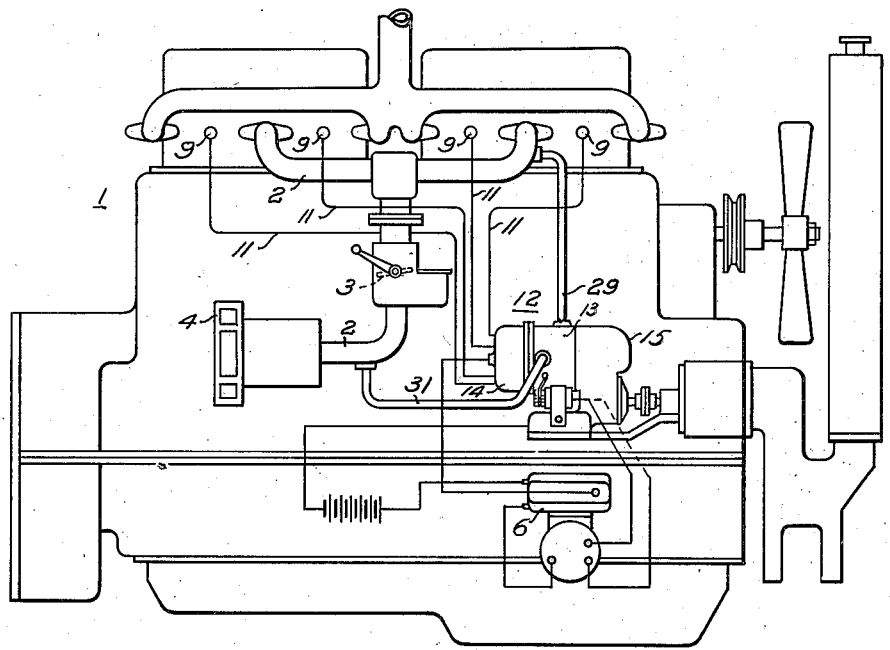
Fig. 1 is a diagrammatic, elevational view of an engine embodying the invention.

Referring to Fig. 1, I denotes an internal combustion engine of the heavy oil solid injection type having the usual air intake manifold 2, a throttle valve 3 therein controlling the flow of air therethrough and an air cleaner 4 connected to the inlet end of the manifold 2 in a well known manner to filter the air passing therethrough. A battery type ignition system is employed in this instance and includes as elements thereof, a spark coil or transformer 6, mechanism for controlling the production and distribution of the sparking current disposed within the casing 12 which is mounted on the side of the engine in any suitable manner and so positioned that the mechanism is operatively associated with a moving part of the engine to be driven thereby, a spark plug 9 for each engine cylinder and electrical conductors 11 connecting the spark plugs with the distributor mechanism.

Figures 2, 3:
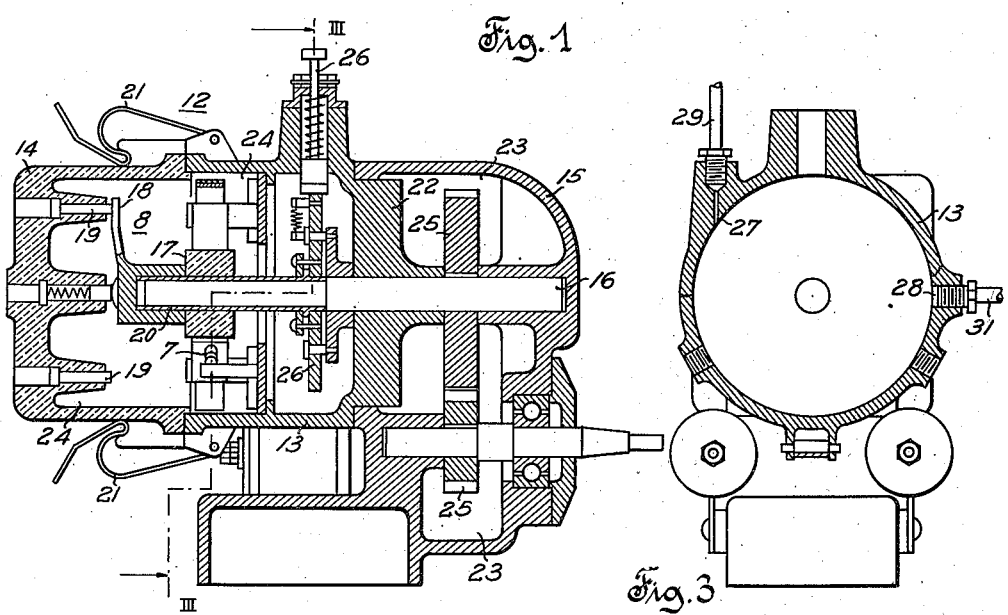
Fig. 2 is a vertical sectional view of the casing containing the distributor and breaker mechanism.
Fig. 3 is a sectional view of the casing taken on line III—III of Fig. 2 with the mechanism omitted.

Referring to Fig. 2, it is seen that the casing 12 comprises complementary metallic portions 13 and 15 held in cooperative relationship by any well known means (not shown) and a non-metallic portion or distributor cap 14; the latter having the usual fixed contacts 19 and being removably secured to the metallic portion 13 by any suitable means such as the spring clips 21. A wall or sealing partition 22, which as shown, is formed integral with the metallic portion 13 and divides the interior of casing 12 into two chambers 23 and 24; the latter containing the fixed distributor contacts 19 and the breaker points 7. A rotatably mounted shaft 16 extends through the chamber 23, the partition 22 and the chamber 24; the shaft being rotated by means of the gears 25 positioned within the chamber 23. A sleeve 20 having fixed thereto the distributor arm 18 and the cam 17 for actuating the breaker points 7 is operatively associated with the shaft 16 for rotation therewith by means of a variable lost motion mechanism 26 which constitutes a manual spark retarding means of known construction. It should be understood that the source of power, the spark coil, the breaker points, the distributor and the spark plugs are electrically connected to obtain the desired operation in a known manner and that the actuating mechanism and casing are properly insulated from the current carrying portions in the usual manner. In fact, the construction and the general arrangement of parts as hereinbefore briefly set forth are well known in the art and a more detailed description is not deemed essential to or necessary for a complete understanding of the invention. However, if further information regarding structural details and the electrical connections is desired, attention is directed to the description of the Mallory system, entitled "Hot Spark for Oil Burning Engines" appearing in the July 25, 1936, issue of Automotive Industries.

Referring to Figs. 1 and 3, it is seen that the metallic wall portion of chamber 24 is drilled at circumferentially spaced points 27 and 28, preferably at least 90° apart, and tapped to provide for pipe connections thereto; one of the drilled holes being calibrated so as to provide an opening of not more than fifteen and not less than six thousandths of an inch in diameter. Pipes 29 and 31 are connected to and communicate with the interior of the manifold 2 on opposite sides of the throttle valve 3 and with the interior of the chamber 24 through the openings 27 and 28 so that when the engine is operating, a limited quantity of clean air will continuously enter the chamber 24 and be withdrawn therefrom together with any volatile oxidizing compounds formed therein.

In other words, during engine operation, the chamber 24 is always maintained at a pressure slightly below that in the manifold outwardly of the throttle valve and slightly above that in the manifold inwardly of said valve thereby maintaining a small pressure differential causing any volatile matter formed within the chamber to flow therefrom into the intake manifold together with a limited amount of clean air bypassed therethrough.

The particular size of the calibrated opening is essential for satisfactory engine operation since if the restriction is not great enough, a sufficient vacuum will be created within the chamber 24 when the throttle valve is closed or partially closed to cause a material reduction in the resistance of the gap occurring at the breaker points which will cause arcing or sparking and burning of the points and will also increase the time interval required to break the primary circuit thus decreasing the spark intensity which is proportional to the magnitude and the rate of change of flux in the core of the spark coil or transformer. Moreover, if the calibrated opening is too large, the quantity of air bypassing the throttle valve during light load and idling operation will be sufficient to adversely affect engine operation and cause overheating as a result of the extremely lean mixture. In addition, such an arrangement would materially interfere with the regulation of the engine under all operating conditions.

Of course, the exact size of the calibrated opening will depend not only upon the particular engine design but also upon the size of the pipes employed to provide the connections between the intake manifold and the chamber 24. However, the main feature to be borne in mind is that the pressure drop through the connections and the chamber 24 providing the bypass about the throttle valve should be just sufficient to maintain only a slight degree of vacuum within the chamber 24 and it is entirely immaterial whether this result is obtained by means of a conduit element comprising a calibrated opening as hereinbefore described or by using pipes of small diameter or by any other equivalent arrangement.

While the previously described arrangement, in which a limited quantity of clean air continuously passes through the chamber 24 during engine operation, is preferable, the destructive corrosive action previously explained may be negatived by placing the interior of chamber 24 in communication with the interior of manifold 2 only on the engine side of the throttle valve by means of connections restricted to such an extent that, during engine operation, the interior of chamber 24 is always subjected to a slight suction effect which is sufficient to cause any volatile oxidizing compounds formed therein to immediately flow therefrom into the intake manifold. Of course, the connections must not be such as to produce a degree of vacuum within the chamber 24 which is objectionable for the reasons previously pointed out.

Although the invention is shown and described in connection with a battery type ignition system, it is obviously applicable to a system employing a magneto or any other suitable means as the source of electric power. Moreover, it is immaterial whether or not the breaker points, the distributor contacts and their operating mechanism are enclosed in what is in effect a single casing or housing since the invention is applicable to any system regardless of the particular arrangement employed to house the aforementioned parts; the only requisite being that the casing or casings housing the elements or parts be provided with means for withdrawing volatile oxidizing compounds resulting from the breaking of the circuit by the breaker and/or the distributor contacts in the manner herein set forth. Furthermore, it is obviously immaterial whether the volatile oxidizing compounds and air is forced or drawn through the chamber in which the elements are positioned.

In addition to the prevention of a destructive corrosive action by the removal of the volatile oxidizing compounds, the circulation of air through the chamber also functions to cool the elements contained therein. While the advantages derived from the invention are most pronounced in connection with ignition systems of the hot spark type, its use is in no manner so limited and the same advantages will be obtained to a lesser degree when the invention is applied to the ordinary ignition system.

Although but a few embodiments of the present invention have been illustrated and described, it will be apparent to those skilled in the art that various changes and modifications may be made therein without departing from the spirit of the invention or from the scope of the appended claims.

I claim:

1. An ignition control mechanism for internal combustion engines having an intake manifold, comprising relatively movable contact members subject to arcing due to the passage of an electric current therethrough, a conduit element in communication with said manifold affording substantial resistance to the passage of air therethrough while said manifold is subject to subatmospheric pressure due to the suction of said engine, and an enclosure for said contact members in communication with said conduit element, said enclosure being adapted to be evacuated, to a subatmospheric pressure insufficient to materially aid arcing between said contact members, by the suction of said engine communicated to said enclosure through said conduit element.

2. An ignition control mechanism for internal combustion engines having an intake manifold, comprising relatively movable contact members subject to arcing due to the passage of an electric current therethrough, an enclosure for said contact members, and means for passing a quantity of air, insufficient to adversely affect the operation of said engine, from said enclosure into said manifold and thereby evacuating said enclosure to a subatmospheric pressure insufficient to materially aid arcing between said contact members, said means including a conduit element in communication with said manifold and said enclosure, and affording substantial resistance to the passage of air therethrough while said manifold is subject to subatmospheric pressure due to the suction of said engine.

3. An ignition control mechanism for internal combustion engines having an intake manifold, comprising relatively movable contact members subject to arcing due to the passage of an electric current therethrough, an enclosure for said contact members, and means for subjecting the interior of said enclosure to a subatmospheric pressure insufficient to materially aid arcing between said contact members and for passing a quantity of air, insufficient to adversely affect the operation of said engine, through said enclosure into said manifold while maintaining said subatmospheric pressure within said enclosure, said means including a conduit element in communication with said manifold and said enclosure and affording substantial resistance to the passage of air therethrough while said manifold is subject to subatmospheric pressure due to the suction of said engine.

4. An ignition control mechanism for internal combustion engines having an intake manifold and a throttle at the inlet of said manifold, comprising relatively movable contact members subject to arcing due to the passage of an electric current therethrough, a conduit element in communication with said manifold at the engine side of said throttle, affording substantial resistance to the passage of air therethrough while said throttle is closed and said manifold is subject to subatmospheric pressure due to the suction of said engine, an enclosure for said contact members in communication with said conduit element and with said manifold at the inlet side of said throttle, said enclosure being adapted to be evacuated, to a subatmospheric pressure insufficient to materially aid arcing between said contact members, by the suction of said engine communicated to said enclosure through said conduit element.

JOSEPH FLAMM.